United States Patent [19]

Kojima

[11] Patent Number: 4,896,861
[45] Date of Patent: Jan. 30, 1990

[54] FLUID CONTROL SOLENOID VALVE
[75] Inventor: Takao Kojima, Himeji, Japan
[73] Assignee: Mitsubishi Denki Kabushiki Kaisha, Japan
[21] Appl. No.: 265,675
[22] PCT Filed: Mar. 1, 1988
[86] PCT No.: PCT/JP88/00230
 § 371 Date: Oct. 31, 1988
 § 102(e) Date: Oct. 31, 1988
[87] PCT Pub. No.: WO88/06692
 PCT Pub. Date: Sep. 7, 1988
[30] Foreign Application Priority Data
 Mar. 2, 1987 [JP] Japan .............................. 62-30067[U]
[51] Int. Cl.⁴ .............................................. F16K 31/06
[52] U.S. Cl. .......................... 251/129.15; 251/129.17; 137/244
[58] Field of Search ....................... 251/129.17, 129.15; 137/244

[56] References Cited
U.S. PATENT DOCUMENTS
3,446,471  5/1964  Westphal ................. 251/129.17 X
4,677,409  6/1987  Kozuka et al. ....................... 335/258
4,778,147 10/1988  Kozuka et al. .................. 251/129.08

FOREIGN PATENT DOCUMENTS
1237394  3/1967  Fed. Rep. of Germany ........................ 251/129.17
1317894  1/1963  France ............................ 251/129.17
0113872  9/1981  Japan ............................. 251/129.17

Primary Examiner—Arnold Rosenthal
Attorney, Agent, or Firm—Leydig, Voit & Mayer

[57] ABSTRACT

A fluid control solenoid valve comprises a housing defining therein a fluid passage including a valve seat having a valve port for allowing the passage of the fluid. A plunger having a valve body and movable between a valve closed position and a valve open position is slidably guided by a plunger guide with a sliding contact region therebetween. A biasing spring biases the valve toward the closed position, and a solenoid coil is disposed for magnetically driving the plunger to the open position against the spring action. The solenoid valve further comprises a nonmagnetic cover disposed around the plunger for substantially closing the sliding contact region between the plunger and the plunger guide against ingress of any foreign matter entrained in the fluid.

4 Claims, 1 Drawing Sheet

FLUID CONTROL SOLENOID VALVE

INDUSTRIAL FIELD

This invention relates to a fluid control solenoid valve, and more particularly, to a fluid control solenoid valve for use in a hydraulic control circuit.

BACKGROUND ART

FIG. 1 illustrates in section a conventional fluid control solenoid valve, which comprises a substantially cylindrical housing 1 made of a magnetic material. The housing 1 defines therein a fluid passage 2 including an inlet port 3 formed in the bottom wall 4 of the housing 1 and outlet ports 5 formed in a cylindrical side wall 6 of the housing 1 at equal circumferential intervals. The housing 1 also comprises a magnetic core 7 having a drain port 8 therein and a flange portion 9 at which the core 7 is secured to the side wall 6 of the housing 1.

A valve seat 10 having a valve port 11 for allowing the passage of the fluid is disposed in the fluid passage 2. In order to open and close the valve port 11, a cylindrical plunger 12 having a substantially frustoconical valve body 13 at its one end is axially slidably disposed within the housing 1 so as to be movable between a close position shown in FIG. 1 in which the valve body 13 engages the valve seat 10 to close the valve port 11 and an open position in which the valve port 13 disengages from the valve seat 10 to open the valve port 11. The plunger 12 has a cylindrical sliding contact surface 14.

The housing 1 is provided therein with a substantially ring-shaped plunger guide 15 having an inner circumferential surface or a guide surface 16 disposed around the cylindrical sliding contact surface 14 of the plunger 12. The sliding contact surface 14 and the guide surface 16 together provide an annular sliding contact region 17 defined between the sliding contact surface 14 of the plunger 12 and the gudie surface 16 of the plunger guide 14 for allowing a guided axial movement of the plunger 12 between the open position and the closed position.

The fluid control solenoid valve also comprises a compression coil spring 18 disposed within a large-diameter portion 19 of the drain port 8. The spring 18 is disposed between a shoulder portion 20 of the drain port 8 and an upper end 21 of the plunger 12 for biasing the plunger 12 toward the closed position shown in FIG. 1.

In order to magnetically drive the plunger 12 from the closed position to the open position against the spring action of the coil spring 18, a solenoid coil 22 is mounted within the housing 1. The solenoid coil 22 is wound on an electrically insulating bobbin 23 which is mounted on an axially extending portion of the magnetic core 7 to bridge between the core 7 and the plunger 12. The solenoid coil 22 wound on the bobbin 23 is fixedly supported by the flange portion 9 of the core 7 and the side wall 6 of the housing 1 and the plunger guide 15. A lead conductor 24 is provided to supply electric power to the solenoid coil 22. The solenoid coil 22, when energized, generates a magnetic flux extending through the magnetic core 7, the plunger 12, the plunger guide member 15, the housing side wall 6 and back to the magnetic core 7, thus magnetically driving the plunger 12 from the closed position against the biasing action of the coil spring 18.

When the fluid control solenoid valve is used in a hydraulic circuit such as a hydraulic circuit for shifting an automotive transmission, hydraulic fluid is filled in the fluid passage 2. When the solenoid coil 22 is not energized, the compression spring 18 urges the plunger 12 and the valve body 13 against the valve port 11 of the valve seat 10 to close it. Then, the fluid passage 2 is closed so that no fluid flow occurs between the inlet and the outlet ports 3 and 5.

When the solenoid coil 22 is energized, the magnetic flux generated by the solenoid coil 22 passes through the above-mentioned magnetic circuit including the plunger 12 to attract the plunger 12 to axially slide along the guide surface 16 of the plunger guide member 14 until it abuts against the end surface of the core 7. This causes the valve body 13 to separate from the valve seat 10 to open the valve port 11, allowing fluid communication between the inlet port 3 and the outlet port 5 through the fluid passage 2. During this time, the drain port 8 is also communicated to the inlet port 3 through an annular narrow clearance or a sliding contact region 17 defined between the sliding contact surface 14 of the plunger 12 and the plunger guide surface 16 of the plunger guide 15.

In certain hydraulic circuits, such as those used with automotive transmission mechanisms, the hydraulic fluid often entrains solid particulate foreign matter such as dust or metallic particles. The foreign matter entrained in the hydraulic fluid often enters into the sliding contact region 17 between the plunger 12 and the plunger guide 15 and the foreign matter bites into and is caught between the sliding surfaces 14 and 16. Therefore, the smooth sliding movement of the plunger 12 is impeded and the plunger 12 often sticks to the plunger guide 15. Fluid leaks may even occur in the valve.

DISCLOSURE OF THE INVENTION

Accordingly, an object of the present invention is to provide a fluid control solenoid valve in which the ingress of foreign matter into the sliding contact region between the plunger and the plunger guide is prevented.

Another object of the present invention is to provide a fluid control solenoid valve in which smooth movement of the valve plunger is ensured.

A further object of the present invention is to provide a fluid control solenoid valve which is reliable in operation.

With the above objects in view, the fluid control solenoid valve comprises a housing defining therein a fluid passage including a valve seat having a valve port for allowing the passage of the fluid. A plunger having a valve body and movable between a valve closed position and a valve open position is slidably guided by a plunger guide with a sliding contact region therebetween. A biasing spring biases the valve toward the closed positions, and a solenoid coil is disposed for magnetically driving the plunger to the open position against the spring action. The solenoid valve further comprises a nonmagnetic cover disposed around the plunger for substantially closing the sliding contact region between the plunger and the plunger guide against ingress of any foreign matter entrained in the fluid.

The plunger may comprise a cylindrical main body guided by the plunger guide and a small-diameter portion coaxially extending from the main body defining a shoulder portion therebetween. The cover may comprise a substantially washer-shaped member attached to the plunger guide at its outer edge and surrounding the small-diameter portion at its inner edge to define a narrow annular gap therebetween.

BRIEF DESCRIPTION OF THE DRAWINGS

The present invention will become more readily apparent from the following detailed description of the best mode for carrying out the invention shown by way of example in the accompanying drawings, in which.

BEST MODE FOR CARRYING OUT THE INVENTION

Figure 1:
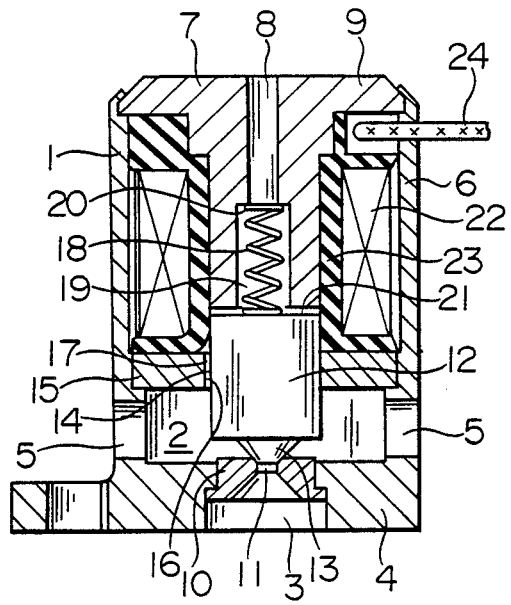
FIG. 1 is a longitudinal sectional view illustrating a conventional fluid control solenoid valve.
Figure 2:
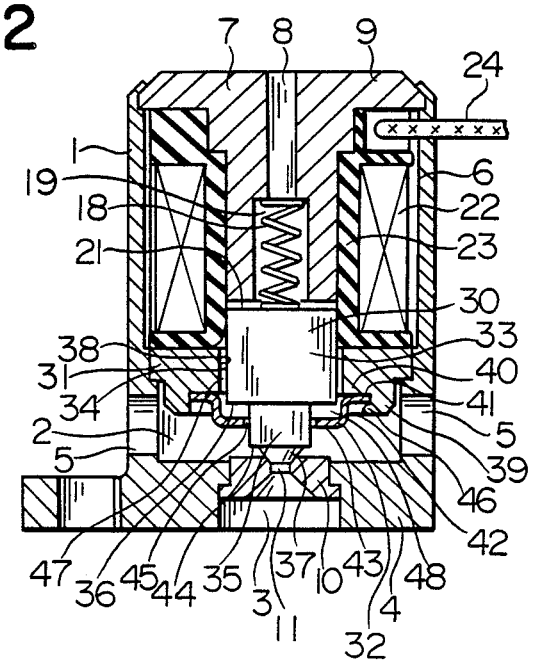
FIG. 2 is a longitudinal sectional view illustrating a fluid control solenoid valve of the present invention.

FIG. 2 illustrates in section a fluid control solenoid valve constructed in accordance with the present invention. The basic structure of the solenoid valve of the present invention shown in FIG. 2 is similar to that of the conventional design shown in FIG. 1 except that the structures of a plunger 30 and a plunger guide 31 are different and that a nonmagnetic cover 32 is added. In other respects, the structure is the same as the conventional design, so that the description will be made only in terms of the structure different from that shown in FIG. 1.

The plunger 30 comprises a cylindrical main body 33 having a cylindrical sliding guide surface 34 guided by the plunger guide 31, a small-diameter portion 35 coaxially extending from the main body 33 to define an annular shoulder portion 36 therebetween, and a frustoconical valve body 37 which is provided at the lower end of the small-diameter portion 35.

The plunger guide 31 has at its inner circumference a sliding guide surface 38 which engages and guides the sliding guide surface 34 of the plunger 30, defining a sliding contact region 47. The plunger guide 31 is a ring-shaped member having an annular ridge 39 and a increased-thickness portion 40 inside of the ridge 39 for securely fixing the non-magnetic cover 32 to the plunger guide 31.

The nonmagnetic cover 32 is a substantially washer-shaped or shallow-dish-shaped member preferably made of brass. The cover 32 may also be made of another suitable metallic or plastic material. The nonmagnetic cover 32 has a crank-shaped cross section and includes an outer ring 41 fixed to the annular ridge 39 of the plunger guide 31 at its outer edge by caulking, for example, at 46. The nonmagnetic cover 32 also includes an intermediate ring 42 extending perpendicularly from the inner edge of the outer ring 41. The end of the intermediate ring 42 is connected to the outer edge of the inner ring 43 which is in a plane spaced from and parallel to the outer ring 41. The cover 32 surrounds the cylindrical surface 44 of the small-diameter portion 35 at its inner edge of the inner ring 43 to define a narrow annular gap 45 therebetween.

Thus, the sliding contact region 47 defined between the sliding surface 34 of the plunger main body 33 and the guide surface 38 of the plunger guide 31 is covered by the nonmagnetic cover 32 and is not directly exposed to the fluid passage 2. The sliding contact region 47 is in fluid communication with the annular gap 45 only via a bent path 48 which passes between the shoulder portion 36 of the plunger 36 and the crank-shaped cover 32.

Preferably, the cross-sectional area of the bent path 48 is increased to define a relatively large space between the gap 45 and the sliding contact region 47, providing a trap for the foreign matter which has entered into it through the annular gap 45.

With the fluid control solenoid valve of the present invention as described above, a nonmagnetic cover is disposed around the plunger for substantially closing the sliding contact region between the plunger and the plunger guide against ingress of any foreign matter entrained in the fluid. Therefore, foreign matter entrained in the hydraulic fluid is substantially prevented from entering and being caught or biting into the sliding contact region between the plunger and the plunger guide, causing the plunger to stick to the plunger guide. Thus, a smooth sliding movement of the plunger is ensured. Fluid leaks in the valve can also be significantly reduced, resulting in a reliable solenoid valve.

What is claimed:

1. A fluid control solenoid valve comprising:
 a housing having a fluid passage including an inlet port and an outlet port;
 a valve seat disposed in said fluid passage, said valve seat having a valve port for allowing the passage of the fluid;
 a plunger having a valve body, said plunger being movable between a closed position in which said valve body closes said valve port and an open position in which said valve port is not closed by said valve body;
 a plunger guide which is disposed around said plunger and which has a contact region which is in sliding contact with said plunger and which guides said plunger between said open position and said closed position;
 biasing means for biasing said valve body toward one of said open and closed positions;
 a solenoid coil for magnetically driving said plunger from said closed position against the action of said biasing means when energized; and
 a nonmagnetic cover which substantially separates said contact region from said fluid passage and which has a hole formed therein through which said plunger passes without contacting the edges of the hole, said contact region being in fluid communication with the hole, whereby said contact region is protected against ingress of foreign matter entrained in the fluid.

2. A fluid control solenoid valve as claimed in claim 1, wherein said plunger comprises a cylindrical main body guided by said plunger guide and a small-diameter portion coaxially extending from said main body defining a shoulder portion therebetween, said small-diameter portion supporting said valve body, and said cover comprises a substantially washer-shaped member attached to said plunger guide at its outer edge and surrounding said small-diameter portion at its inner edge to define a narrow annular gap therebetween, whereby a bent flow path which connects said contact region with the hole in said cover is formed between said shoulder portion of said plunger and said washer-shaped cover member.

3. A fluid control solenoid valve as claimed in claim 2, wherein said bent flow path has a relatively large space providing a trap for foreign matter which has entered into said flow path.

4. A fluid control solenoid valve as claimed in claim 1, wherein a bent passageway which connects said contact region with the hole in said cover is formed between said plunger and said cover.

* * * * *